United States Patent [19]
Rebentisch

[11] 3,888,441
[45] June 10, 1975

[54] SUPPORT ARRANGEMENT

[75] Inventor: Hugo E. Rebentisch, Garden City, Mich.

[73] Assignee: Unistrut Corporation, Wayne, Mich.

[22] Filed: Apr. 8, 1974

[21] Appl. No.: 458,886

[52] U.S. Cl. .................................. 248/73
[51] Int. Cl. ............................... F16l 3/08
[58] Field of Search .......... 248/73, 220.5, 223, 224, 248/225, 243; 211/176, 177

[56] References Cited
UNITED STATES PATENTS

| | | | |
|---|---|---|---|
| 2,218,894 | 10/1940 | Schlosser | 248/73 |
| 3,601,432 | 8/1971 | Fenwick | 248/243 X |
| 3,606,027 | 9/1971 | Clements | 211/177 |

FOREIGN PATENTS OR APPLICATIONS

| | | | |
|---|---|---|---|
| 1,342,726 | 9/1963 | France | 248/243 |

*Primary Examiner*—William H. Schultz
*Attorney, Agent, or Firm*—Peter Xiarhos; Elmer J. Nealon; Norman J. O'Malley

[57] ABSTRACT

A support arrangement for supporting loads such as electrical cable. The support arrangement includes a tubular member having a plurality of vertically-aligned rectangular-shaped openings therein and a support arm assembly. The support arm assembly includes an end bracket having a T-shaped locking portion disposed in a first opening of the tubular member and a tab portion disposed in a second opening of the tubular member spaced from the first opening. The support arm assembly also includes a support channel section attached to the end bracket and upon which a load, such as an electrical cable, may be placed and secured.

6 Claims, 9 Drawing Figures

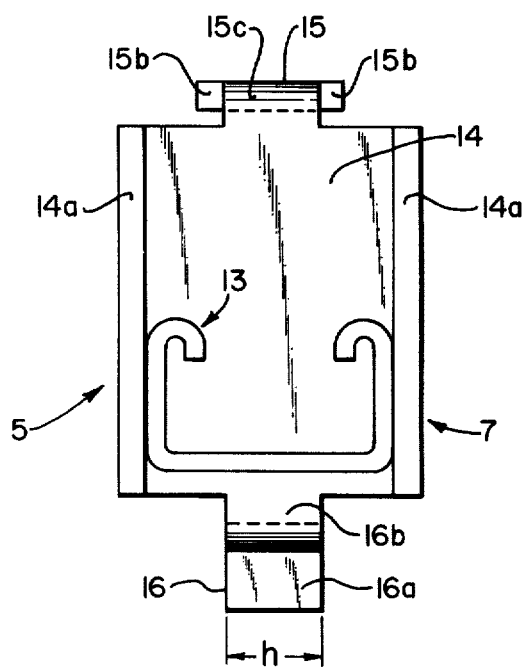
FIG. 3
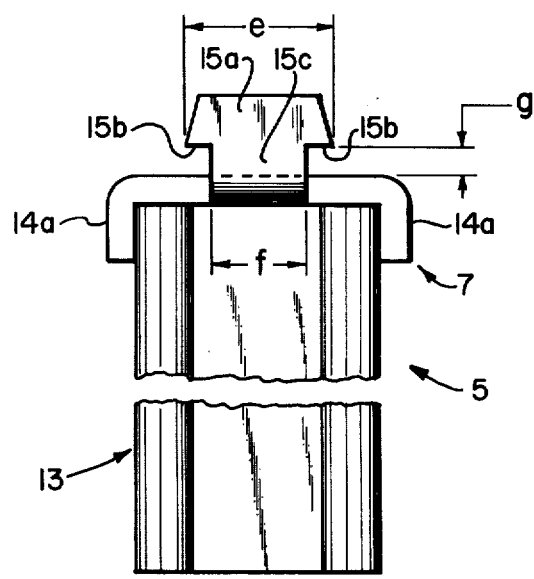
FIG. 5
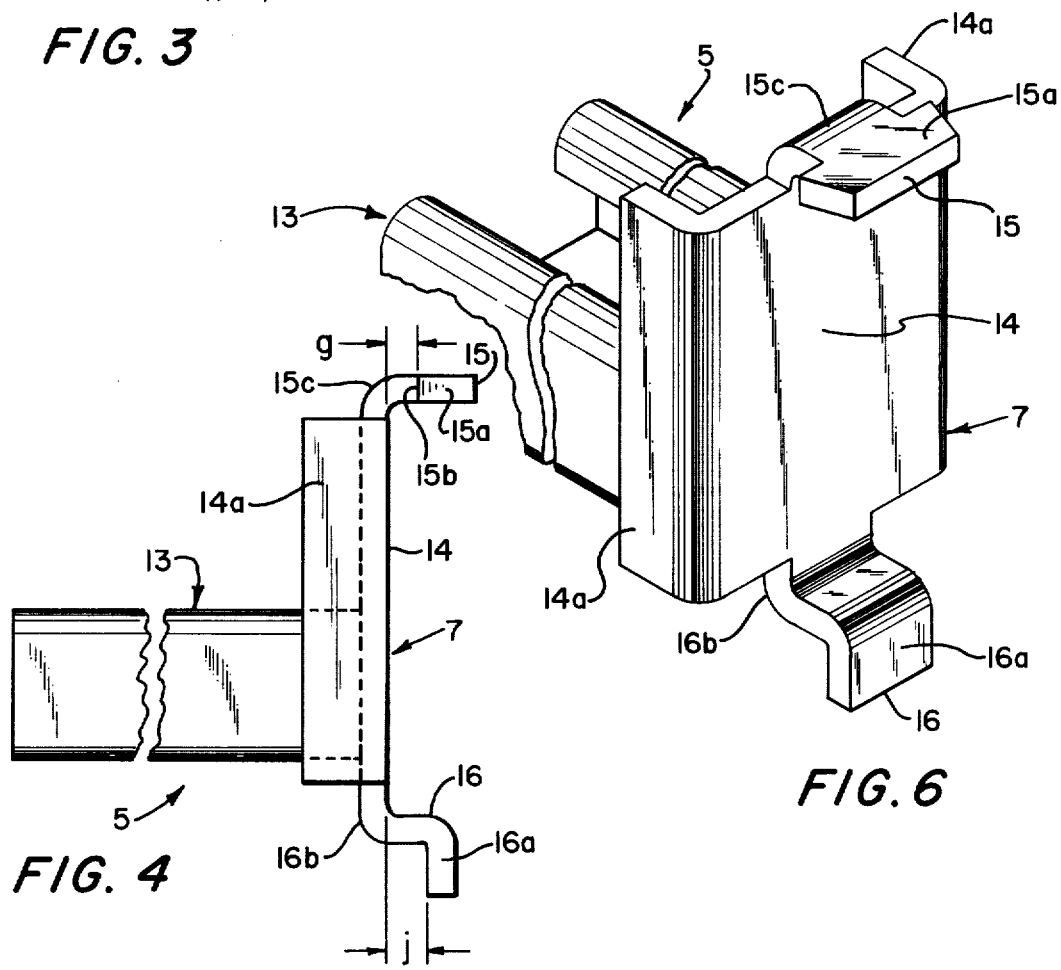
FIG. 4
FIG. 6

3,888,441

SUPPORT ARRANGEMENT

BACKGROUND OF THE INVENTION

The present invention relates to a support arrangement and, more particularly, to a support arrangement for supporting a load such as an electrical cable in applications such as cable vault and manhole installations.

In cable vault and manhole installations in the telephone utility field it is often required that a support frame be erected for supporting large numbers of electrical cables as commonly employed for the communication of telephone messages. Desirably, the support frame should be of sturdy construction and be capable of supporting a substantial weight of electrical cable. In addition, the support frame should be capable of being easily set up and, if later required, easily dismantled. At the present time, support frames for cable vault and manhole installations are most commonly constructed from a number of metal channel sections containing a plurality of T-shaped openings therein. These channel sections are arranged in an upright fashion and support arms having T-shaped end portions, commonly referred to as "cable hooks," are inserted via the T-shaped end portions into the T-shaped openings in the channel sections. Electrical cables are then strung from cable hook to cable hook and securely attached thereto. Support frames constructed in the above-described manner have proven to be generally satisfactory and acceptable. However, the cable hooks of these support frames are capable of being easily upset, for example, by an installer or by natural vibratory forces or tremors (e.g., in an earthquake zone) with the result that the cable hooks are able to move up and out of the associated T-shaped openings in the channel sections. It therefore becomes necessary in these situations to expend additional effort to replace the cable hooks in their openings. In addition, the very configuration of the T-shaped openings in the channel sections imposes limitations on the amount of weight of cable that may be placed on the cable hooks without distorting the metal of the channel sections in the vicinity of the openings.

BRIEF SUMMARY OF THE INVENTION

In accordance with the present invention, a support arrangement is provided having general utility but which is particularly suitable for use in constructing support frames for cable vault and manhole installations. The support arrangement generally comprises a structural member and a support assembly. The structural member includes a side having a plurality of rectangular openings therein defined by top, bottom and side edge surfaces in the side. The side further has a front surface and a rear surface and the rectangular openings in the side each have a predetermined height and width. The support assembly includes an end bracket and a support arm adjoining the end bracket. The end bracket includes a first portion external to the outer surface of the side of the structural member, a T-shaped locking portion adjoining the first portion and extending into a first rectangular opening in the side of the structural member, and a tab portion adjoining the first portion and extending into a second rectangular opening in the side of the structural member. The T-shaped locking portion has a bottom surface abutting the bottom edge surface associated with the first rectangular opening and front edges abutting the inner surface of the side of the structural member adjacent to the first rectangular opening. The T-shaped locking portion further has a maximum width less than either diagonal of the first rectangular opening but greater than the width of the first rectangular opening, and a minimum width slightly less than the width of the first rectangular opening whereby the T-shaped locking portion is incapable of any significant lateral movement within the first rectangular opening.

The tab portion of the end bracket includes a first section abutting the inner surface of the side of the structural member below the bottom edge surface associated with the second rectangular opening, and a second section intermediate the first section of the tab portion and the first portion of the end bracket and extending from within the second rectangular opening to the first portion of the end bracket. The second section of the tab portion has a width slightly less than the width of the second rectangular opening whereby the tab portion is incapable of any significant lateral movement within the second rectangular opening.

BRIEF DESCRIPTION OF THE DRAWINGS

Various objects, features and advantages of a support arrangement in accordance with the present invention will be apparent from the following detailed discussion taken in conjunction with the accompanying drawing in which:

FIGS. 3, 4, 5 and 6 are front, side, top and rear perspective views, respectively, of a support arm assembly employed in the support arrangement of the invention;

DETAILED DESCRIPTION OF THE INVENTION

Figure 1:
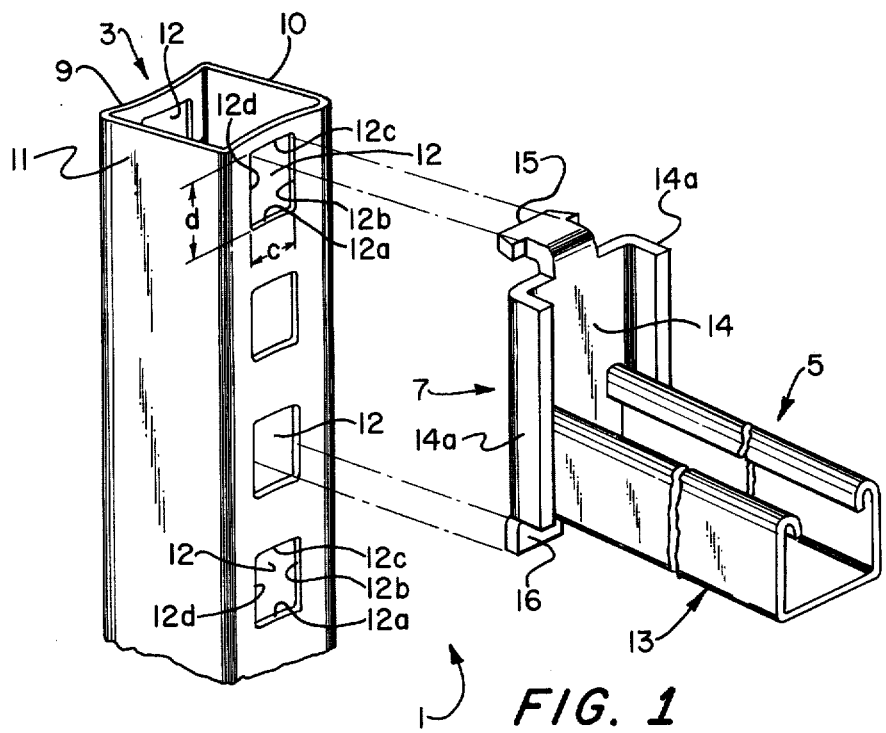
FIG. 1 is an exploded perspective view of a support arrangement in accordance with the present invention.
Figure 2:
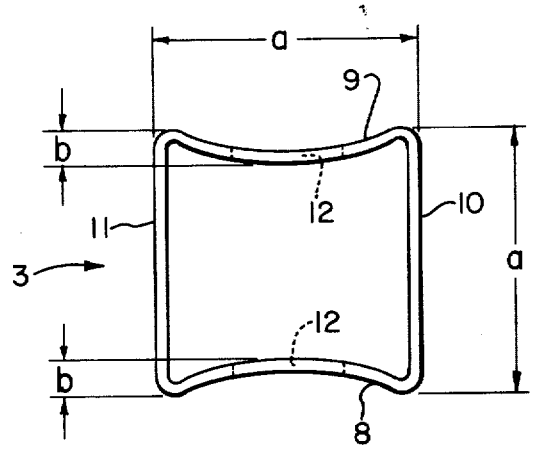
FIG. 2 is a top view of a four-sided tubular structural member employed in the support arrangement of the invention.

Referring now to FIG. 1, there is shown in an exploded perspective view a support arrangement 1 in accordance with the present invention. The support arrangement 1 generally includes a tubular structural member 3, only a portion of which is shown in FIG. 1, and a support arm assembly 5. The tubular member 3, a top view of which is shown in FIG. 2, has four sides of which two sides, 8 and 9, are concave and the other two sides, 10 and 11, are flat. The concave sides 8 and 9 of the tubular member 3 have a plurality of equispaced rectangular-shaped openings 12 provided longitudinally therein, these openings being defined by top, bottom and side edge surfaces 12a–12d in the concave sides 8 and 9. Although not shown in FIGS. 1 and 2, openings may also be provided in the flat sides 10 and 11 of the tubular member 3, of any desired configuration, by which several tubular members may be readily secured to each other and also to other structural elements, as by nuts, bolts and connecting fittings, to form a complete support frame for use in applications such as the aforementioned telephone cable vault and telephone manhole installations. The tubular member 3, as employed in the present invention, may be produced from 12-gauge pre-galvanized steel with each side having a typical width, shown at $a$ in FIG. 2, of 1¾ inches. A typical maximum depth of concavity for the concave sides 8 and 9, measured with respect to the inner surfaces of the sides and shown at $b$ in FIG. 2, is 7/32 inch. The openings 12 in the concave sides 8 and 9 each have a typical width, shown at $c$ in FIG. 1, of ¾ inch and a typical length, shown at $d$ in FIG. 1, of ⅞ inch. The openings 12 are typically spaced from each other by 1½ inches on centers.

The aforementioned support arm assembly 5 of FIG. 1, several other views of which are presented in FIGS. 3-6, generally includes an end bracket 7 and a channel support section 13. The end bracket 7, which may be fabricated from 3/16 inch steel, includes a flat portion 14; a pair of side portions 14a integral with the flat portion 14; a T-shaped locking portion 15 extending outwardly from the top of, and integral with, the flat portion 14; and a tab portion 16 extending outwardly from the bottom of, and integral with, the flat portion 14. As will be described in detail hereinafter, the T-shaped locking portion 15 of the end bracket 7 is arranged to be inserted into one of the openings 12 in the tubular member 3 and the tab portion 16 is arranged to be inserted into a second opening 12 spaced from the first opening in the tubular member 3.

The T-shaped locking portion 15 includes a flat, wide trapezodial-shaped section 15a in a plane normal to the plane of the flat portion 14 and having front edges 15b, and a narrow, arcuate neck section 15c extending between the section 15a and the flat portion 14. To insure that a proper fit is obtained for the T-shaped locking portion 15 in its associated opening 12 in the tubular member 3, the maximum width of the trapezoidal-shaped section 15a of the T-shaped locking portion 15, shown at $e$ in FIG. 5, is made to be less than the length of either diagonal of the opening but greater than the width $c$ of the opening. In addition, the width of the arcuate neck section 15c, shown at $f$ in FIG. 5, is made to be slightly less the width $c$ of the opening 12. The length of the arcuate neck section 15c, from the edges 15b of the section 15a to the plane of the back surface of the flat portion 14, shown at $g$ in FIGS. 4 and 5, is made to be approximately equal to the maximum depth of concavity $b$ of the concave side in which the opening 12 is provided.

The aforementioned tab portion 16 of the end bracket 7 includes, as shown in the various figures, a flat section 16a in a plane spaced from and parallel to the plane of the flat portion 14, and an arcuate section 16b extending between the flat section 16a and the flat portion 14. As in the case of the arcuate neck section 15c of the T-shaped locking portion 15, the width of each of the sections 16a and 16b of the tab portion 16, shown at $h$ in FIG. 3, is made approximately equal to the width $c$ of the opening 12 in which the tab portion 16 is to be inserted. In addition, the length of the arcuate section 16b, from the outer surface of the section 16a to the plane of the back surface of the flat portion 14, shown at $j$ in FIG. 4, is made to be approximately equal to the maximum depth of concavity $b$ of the concave side having the opening 12 in which the tab portion 16 is to be inserted.

The aforementioned channel support section 13 may take any of several possible forms. In the various figures, the channel support section 13 has been shown to be of a commercially-available channel section sold by the Unistrut Corporation, Wayne, Mich., under trade name "Unistrut." The channel support section 13, of whatever type, is secured to the front surface of the flat portion 14 and to the side portions 14a of the end bracket 7, as by welding, and preferably within the lower half of the flat portion 14, as shown in the figures. The channel support section 13 may then be used to support a load, such as a length of electrical cable, transverse to the long dimension thereof. If the channel support section 13 is a "Unistrut" channel section, appropriate cable clamps useable with the "Unistrut" channel section may be employed to secure the cable to the "Unistrut" channel section.

Figure 8:
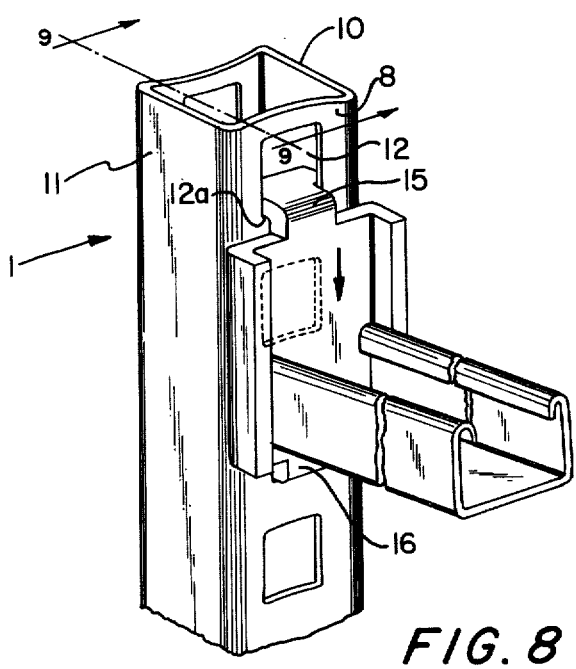
FIG. 8 is a perspective view of the support arrangement of the invention in its final assembled state.
Figure 9:
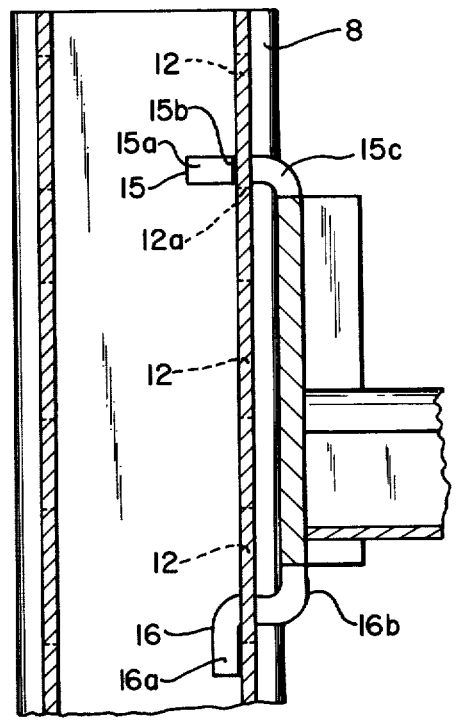
FIG. 9 is a cross-sectional view of the support arrangement of the invention, taken along line 9—9 in FIG. 8.

To assemble the tubular member 3 and the support arm assembly 5 to provide the support arrangement 1 of the invention, the T-shaped locking portion 15 of the support arm assembly 5 is first inserted along either diagonal of one of the openings 12 provided in the tubular member 3, for example, an opening in the concave side 8. The support arm assembly 5 is then turned through an angle (of approximately 45°) while, at the same time, the support arm assembly 5 is moved upwardly, as indicated by the vertical arrow in FIG. 7, until the tab portion 16 thereof is in front of another one of the openings 12 in the concave side 8, namely, the second opening 12 beneath the first opening 12 in which the T-shaped locking portion 15 is inserted. Once the tab portion 16 of the support arm assembly 5 has been moved to a position in front of its associated opening 12, the tab portion 16 is pushed into the opening 12 as indicated by an arrow adjacent to the tab portion 16 in FIG. 7. The support arm assembly 5 is then moved downwardly as indicated by an arrow in FIG. 8, until the bottom surface of the T-shaped locking portion 15 abuts against the surface 12a associated with the opening 12 and the front surface of the tab portion 16 abuts against the inner surface of the associated concave side 8. The state of the support arrangement 1 at this point, shown in FIG. 8, represents the final state of the support arrangement 1. FIG. 9 illustrates, in a cross-sectional view taken along line 9—9 in FIG. 8, interior details of the support arrangement 1 in its final assembled state.

As shown in FIG. 9, when the support arrangement 1 is in its final assembled state, the bottom surface of the T-shaped locking portion 15, more particularly, a portion of the bottom surface of the arcuate neck section 15c, abuts against the lower edge surface 12a of the tubular member 3 and the front edges 15b of the section 15a of the T-shaped locking portion 15 abut against the inner surface of the concave side 8. Since the maximum width $e$ (FIG. 5) of the T-shaped locking portion 15 is greater than the width $c$ of the opening 12 and the width $f$ (FIG. 5) of the arcuate neck section 15c is slightly less than the width $c$ of the opening 12, as previously indicated, the T-shaped locking portion 15 fits snugly within its opening 12 and is incapable of any significant lateral movement. Also, in the final assembled state of the support arrangement 1, the front surface of the flat section 16a of the tab portion 16, which is aligned with the surface defined by the edges 15b of the section 15a of the T-shaped locking portion 15, abuts against the inner surface of the concave side 8, thereby preventing its removal from the opening 12 when in this position. The selection of the width $h$ (FIG. 3) of the tab portion 16, particularly the arcuate section 16$b$, to be slightly less than the width $c$ of the associated opening 12 also prevents any lateral movement of the tab portion 16 within the opening 12. Finally, and as most clearly indicated in FIG. 8, in the final state of the support arrangement 1, the rear surface of the flat portion 14 of the end bracket 7 of the support arm assembly 5, by virtue of the dimensions selected for the T-shaped locking portion 15 and the tab portion 16, as previously discussed, abuts against the corners formed by the concave side 8 and the adjacent flat sides 10 and 11. The support arm assembly 5, in addition to not being capable of any significant lateral movement, as discussed hereinabove, is also therefore incapable of any forward or rearward movement.

Figure 7:
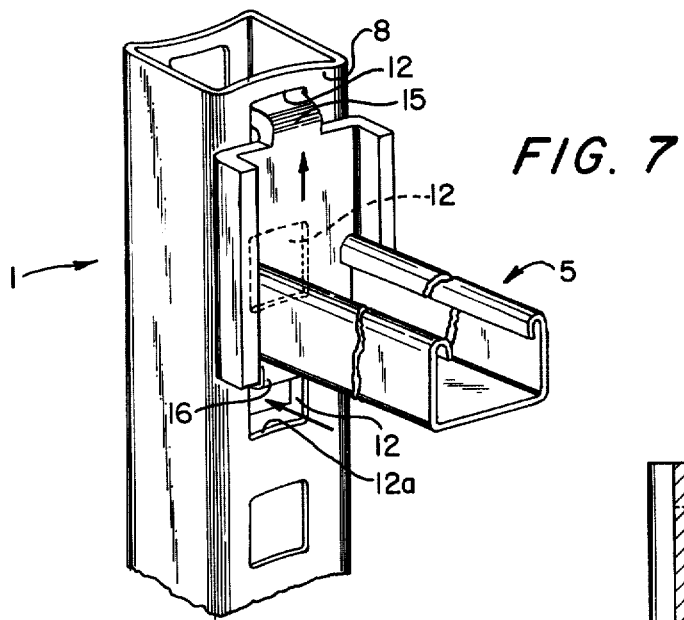
FIG. 7 is a perspective view of the support arrangement of the invention in one stage of assembly.

To disassemble the support arrangement 1, it is only necessary to move the support arm assembly 5 upward until the flat section 16a of the tab portion 16 is visible behind its associated opening 12, for example, as shown in FIG. 7, then to remove the tab portion 16 from the opening and, finally, to turn the support arm assembly 5 to remove the T-shaped locking portion 15 from its associated opening 12. It will be noted that the above disassembly operations, while simple to perform intentionally, are not very likely to occur in the precise sequence unintentionally, whether due to accident or normal vibratory forces or tremors.

While there has been shown and described what is considered a preferred embodiment of the invention, it will be obvious to those skilled in the art that various changes and modifications made be made therein without departing from the invention as called for in the appended claims.

What is claimed is:

1. A support arrangement comprising:
   a structural member including a side having a plurality of rectangular openings therein defined by top, bottom and side edge surfaces in the side, said side having a front surface and a rear surface and the rectangular openings in said side each having a predetermined height and width;
   a support assembly including an end bracket and a support arm adjoining the end bracket, said end bracket including a first portion external to the outer surface of the side of the structural member, a T-shaped locking portion adjoining the first portion and extending into a first rectangular opening in the side of the structural member, and a tab portion adjoining the first portion and extending into a second rectangular opening in the side of the structural member;
   said T-shaped locking portion having a bottom surface abutting the bottom edge surface associated with the first rectangular opening and front edges abutting the inner surface of the side of the structural member adjacent to the first rectangular opening, said T-shaped locking portion further having a maximum width less than either diagonal of the first rectangular opening but greater than the width of the first rectangular opening, and a minumum width slightly less than the width of the first rectangular opening whereby the T-shaped locking portion is incapable of any significant lateral movement within the first rectangular opening, said T-shaped locking portion further being capable of upward movement along the first rectangular opening when an upward motion is imparted to the support assembly; and
   said tab portion including a first section having a surface abutting the inner surface of the side of the structural member below the bottom edge surface associated with the second rectangular opening, and a second section intermediate the first section of the tab portion and the first portion of the end bracket and extending from within the second rectangular opening to the first portion of the end bracket, said second section of the tab portion having a width slightly less than the width of the second rectangular opening whereby the tab portion is incapable of any significant lateral movement within the second rectangular opening, said first section of the tab portion also being capable of upward movement along the second rectangular opening, together with the T-shaped locking portion moving upwardly along the first rectangular opening, when an upward motion is imparted to the support assembly.

2. A support arrangement in accordance with claim 1 wherein:
   the rectangular openings in the side of the structural member are vertically aligned with each other and have the same length and width.

3. A support arrangement in accordance with claim 1 wherein:
   the side of the structural member is concave;
   the first portion of the end bracket has a surface abutting the outer surface of the concave side;
   the T-shaped locking portion of the end bracket includes a first section and an adjoining second narrow section, the length of the second section from the first section to the aforsaid surface of the first portion of the end bracket being approximately equal to the maximum depth of concavity of the concave side as measured with respect to the inner surface of the concave side; and
   the length of the second section of the tab portion from the first section of the tab portion to the aforesaid surface of the first portion of the end bracket is approximately equal to the maximum depth of concavity of the concave side as measured with respect to the inner surface of the concave side.

4. A support arrangement in accordance with claim 3 wherein:
   the first portion of the end bracket, the first section of the T-shaped locking portion and the first section of the tab portion are all flat and the second section of the T-shaped locking portion and the second section of the tab portion are both arcuate.

5. A support arrangement comprising:
   a tubular structural member having four sides, two opposite ones of said sides being flat and the other opposite sides being concave, each of the concave sides having an inner surface and an outer surface and further having a plurality of vertically-aligned spaced rectangular openings therein, each of said openings being defined by top, bottom, and side edges of the tubular structural member and each opening having a predetermined height and width;
   a support assembly including an end bracket and a support arm secured to the end bracket, said end bracket including a first flat portion having a surface abutting corner areas of the outer surface of one of the concave sides, a T-shaped locking portion adjoining the first portion and extending into a first rectangular opening in the aforesaid concave side of the structural member, and a tab portion adjoining the first portion and extending into a second rectangular opening in the aforesaid concave side of the structural member;

said T-shaped locking portion having a bottom surface abutting the bottom edge surface of the tubular member at the first rectangular opening and including a first, wide, flat section in a plane normal to the plane of the first portion of the end bracket and a second, narrow, arcuate neck section intermediate the first section and the first portion of the end bracket and extending from within the first rectangular opening to the first portion of the end bracket, the first section of the T-shaped locking portion having front edges adjacent to the arcuate neck section abutting the inner surface of the concave side adjacent to the first rectangular opening, the first section of the T-shaped locking portion further having a maximum width less than either diagonal of the first rectangular opening but greater than the width of the first rectangular opening, and the arcuate neck section having a width slightly less than the width of the first opening whereby the T-shaped locking portion is incapable of any significant lateral movement within the opening, the arcuate neck section further having a length from the first section to the aforesaid surface of the first portion of the end bracket approximately equal to the maximum depth of concavity of the concave side as measured with respect to the inner surface of the concave side, said T-shaped locking portion further being capable of upward movement along the first rectangular opening when an upward motion is imparted to the support assembly; and said tab portion includes a first, flat section in a plane spaced from and parallel to the plane of the first portion of the end bracket and having a surface abutting the inner surface of the concave side below the bottom edge surface at the second rectangular opening, and a second arcuate section intermediate the first section of the tab portion and the first portion of the end bracket and extending from within the second rectangular opening to the first portion of the end bracket, said second section of the tab portion having a width slightly less than the width of the second rectangular opening whereby the tab portion is incapable of any significant lateral movement within the second rectangular opening, and said second section having a length from the first section to the aforesaid surface of the first portion of the end bracket approximately equal to the maximum depth of concavity of the concave side as measured with respect to the inner surface of the concave side, said first section of the tab portion also being capable of upward movement along the second rectangular opening, together with the T-shaped locking portion moving upwardly along the first rectangular opening, when an upward motion is imparted to the support assembly.

6. A support arrangement in accordance with claim 1 wherein:

the rectangular openings in the concave sides have the same length and width.

* * * * *